No. 872,030. PATENTED NOV. 26, 1907.
J. STICKNEY.
AXLE SPINDLE.
APPLICATION FILED APR. 27, 1907.
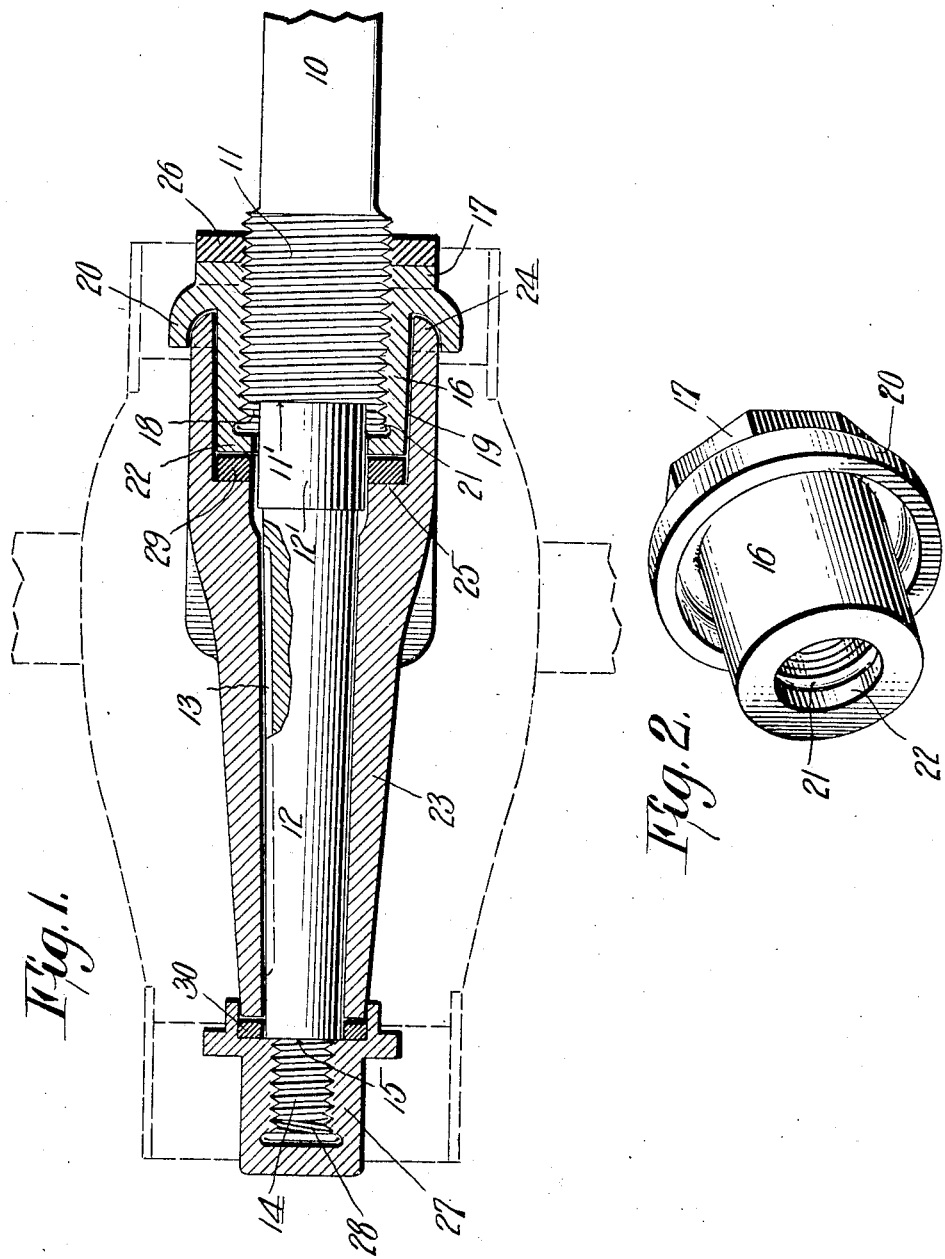

UNITED STATES PATENT OFFICE.

JAMES STICKNEY, OF BAD AXE, MICHIGAN.

AXLE-SPINDLE.

No. 872,030.  Specification of Letters Patent.  Patented Nov. 26, 1907.

Application filed April 27, 1907. Serial No. 370,678.

*To all whom it may concern:*

Be it known that I, JAMES STICKNEY, a citizen of the United States, residing at Bad Axe, in the county of Huron and State of Michigan, have invented certain new and useful Improvements in Axle-Spindles, of which the following is a specification.

This invention relates to axles and spindles for vehicle wheels, and has particular reference to such devices whereby simplicity of construction and high degree of efficiency of operation are attained.

The invention consists in the novel features of construction and combination of elements hereinafter fully set forth and claimed, and illustrated in the accompanying drawings, in which:

Figure 1 is a longitudinal section of the invention with the parts adjusted in operative position, and Fig. 2 is a detail perspective view of the adjustable shoulder nut to be hereinafter described.

Like reference characters are employed to indicate corresponding parts on both figures.
In the preferred embodiment of this invention the axle 10, which may be, generally speaking, of any suitable construction, preferably of steel, is provided with a threaded enlargement 11, substantially cylindrical in general outline, and having a shoulder 11' at its outer end, adjacent to which is a smooth short cylindrical portion 12'. Projecting outwardly from the said cylindrical portion is the spindle portion 12, slightly tapering and provided with an oil groove 13, and having its outer reduced end 14 screw threaded, adjacent to which is provided a shoulder 15.

Adjustably mounted upon the enlargement 11 of the axle is a shoulder nut 16 having at its inner end a polygonal portion 17 for the application of a wrench or spanner, and having on its other end an inwardly projecting flange 22 which has a smooth sliding fit on the aforesaid cylindrical portion 12' of the axle. The interior of the said shoulder nut is bored out at 21 and is provided with a female thread 18 corresponding to the thread on the exterior surface of the enlargement 11. The threads on the parts 11 and 16 are preferably of that character known as pipe cut threads, the same having sharp angles. By the use of this kind of thread less metal needs to be cut away. The exterior surface 19 of the greater part of the said nut is smooth and slightly tapered to correspond with the taper of the spindle 12. Surrounding the nut 16 and preferably formed integral therewith at its inner end is a dust guard 20.

The hub thimble 23 is interiorly tapered to coöperate with the spindle 12 with which it coincides throughout the major portion of its length. The inner and larger end 24 of the thimble is likewise slightly tapered to coöperate with the exterior surface 19 of the shoulder nut 16 upon which it is adapted to turn, and the extreme end projects beneath the aforesaid dust guard 20. Between the two tapered portions of the thimble is provided a shoulder 25.

There is provided as a means to lock the adjustable shoulder nut in an adjusted position a jam nut 26 interiorly screw threaded and mounted upon the threaded portion 11 of the axle against the inner end of said shoulder nut.

Mounted upon the outer end of the spindle is a nut 27, interiorly screw threaded at 28 to coöperate with the threads on the reduced end 14, and adapted to be screwed tightly against the aforesaid shoulder 15. Located between the shoulder 25 of the thimble and the flange 22 of the adjustable shoulder is located a metallic wear ring 29 which is made to fit easily upon the cylindrical portion 12' of the axle. Upon the outer end of the spindle 12 adjacent to the shoulder 15 thereof is another wear ring 30, and the latter ring is located directly between the body of the nut 27 and the outer end of the thimble 23.
These rings 29 and 30 are made of any suitable wear resisting metal, such for example, as bronze. It will of course be understood that the wheel hub is secured in any suitable manner to the thimble 23.

Having thus specifically set forth the construction of the invention, the manner of assembling the same and the mode of adjustment thereafter will be appreciated. The nut 26 is first screwed upon the enlargement 11 well inwardly and this is followed by the adjustable nut 16. The wear ring 29 is then slipped in place upon the cylindrical portion 12' followed by the hub or thimble 23. The ring 30 follows the thimble 23 after which the nut 27 is put in place and screwed tightly against the shoulder 15 of the spindle. The next step is to move the thimble outwardly against the ring 30 and this operation is followed by screwing the adjustable shoulder nut 16 outwardly until the desired clearance between its flange 22 and the ring 29 is secured, and when this is attained the jam nut 26 is forced firmly against the nut 16 securing it in place. The amount of clearance between the shoulder nut and the ring 29 will vary according to individual taste or in accordance with the exigencies of any particular case. It has been found, however, that a clearance of approximately .03 of an inch is usually the best. This amount will ordinarily prevent rattling of the parts. With the parts adjusted as herein described initially, the flange 22 will be spaced from the shoulder 11' a suitable distance. Likewise the nut 26 will be from the extreme inner end of the portion 11 a slight distance. The end thrust of the wheel is received by the wear rings 29 and 30, and the lateral wear of the thimble is received by the parts 12 and 19. The said wear rings will be little if any affected by usage, and upon excessive wear of the parts 12 and 19 it is only necessary to remedy this objectionable circumstance to loosen the nut 26, and likewise loosen the shoulder nut 16 causing the flange 22 thereof to approach the shoulder 11', and then the thimble may be moved inwardly until the proper adjustment thereof is secured with respect to the tapered parts 12 and 19 with which it coöperates, and this operation is followed by replacing the ring 30 by a thicker one, or if desired the ring 30 may be retained and an additional ring put in place against the outer end of the thimble. When the proper degree of tightness has been secured with respect to the spindle the shoulder nut 16 will be re-adjusted to its proper place in a manner similar to that above described in connection with the initial adjustment thereof.

By the construction herein set forth a vehicle axle spindle of extreme simplicity is realized. No leather washers are employed or needed. The wheel thus mounted will wear a long time without adjustment. The wheel may be readily removed and replaced for the purpose of cleaning the spindle and oiling the same by the simple removal of the nut 27 in the usual manner and without affecting in any way the adjustment of the shoulder nut 16.

Having thus described the invention, what is claimed as new is:

1. The combination with an axle having a threaded enlargement, an intermediate cylindrical portion, a tapering spindle and a threaded outer extremity, of a shoulder nut adjustably screw threaded upon the aforesaid threaded enlargement and provided with an inwardly projecting flange fitted upon said cylindrical portion of the axle, the said nut having a smooth and slightly tapering outer surface, a metallic wear ring slidably fitted upon the axle against the said flange, a hub thimble having tapering interior portions to coöperate with the aforesaid tapering members and an intermediate shoulder to abut against said wear ring, and means to prevent outward displacement of the thimble with respect to the axle.

2. In a device of the class described, the combination of an axle having a threaded enlargement, an adjacent smooth portion, and a tapering spindle, an adjustable shoulder nut screw threaded upon the aforesaid enlargement of the axle, said shoulder nut having an inwardly projecting flange and an outer smooth bearing surface, a wear ring on the smooth portion of the axle and adjacent to the said flange, a hub thimble fitted upon the said smooth bearing surface of the shoulder nut and the tapering spindle, and having an intermediate shoulder abutting against said wear ring, a wear ring at the outer end of the spindle adjacent to the outer end of the thimble, means to retain the outer wear ring and thimble in adjusted position with respect to the axle, and means to adjust and lock the said shoulder nut in position upon the said axle enlargement.

In testimony whereof I affix my signature in presence of two witnesses.

JAMES STICKNEY.

Witnesses:
 DANIEL W. MCLEAN,
 WALTER ROGERS.